R. H. HASSLER.
SHOCK ABSORBER.
APPLICATION FILED MAY 6, 1919.
1,420,098.
Patented June 20, 1922.
2 SHEETS—SHEET 1.
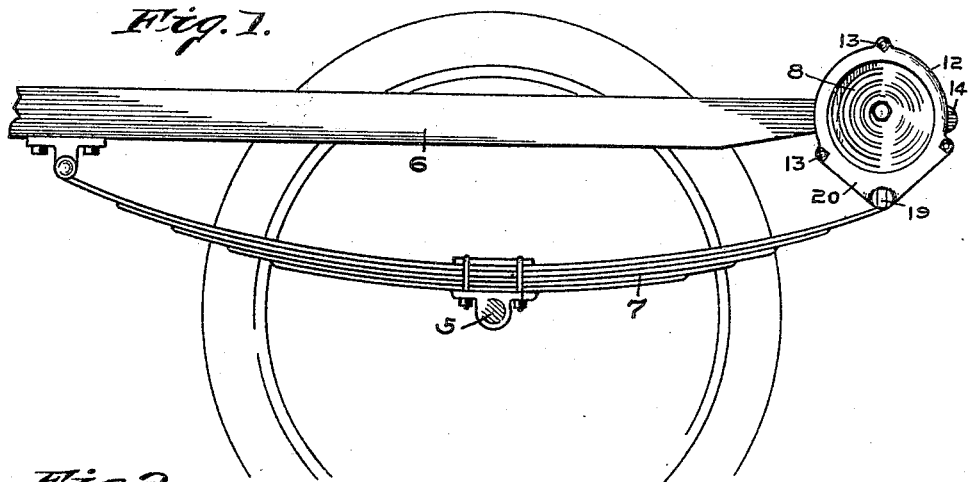
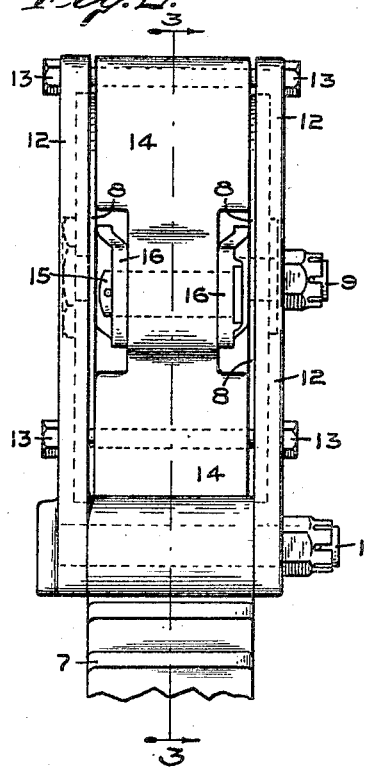
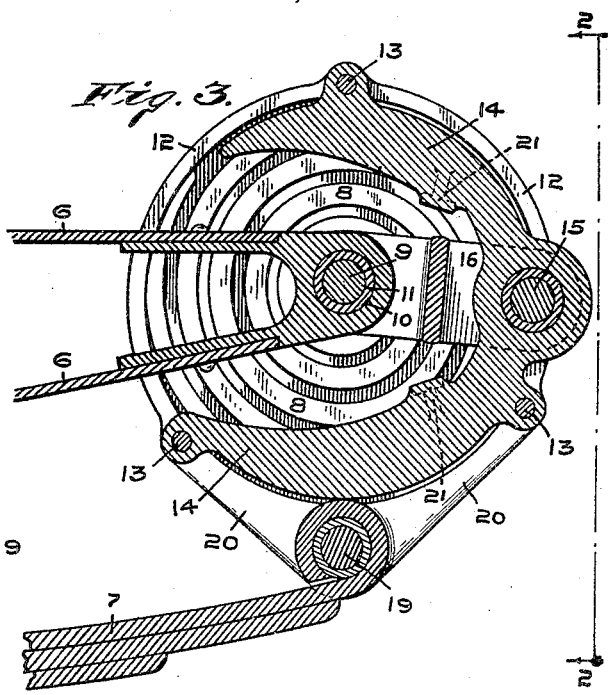
INVENTOR:
Robert H. Hassler,
By Frank W. Woerner,
ATTORNEY.

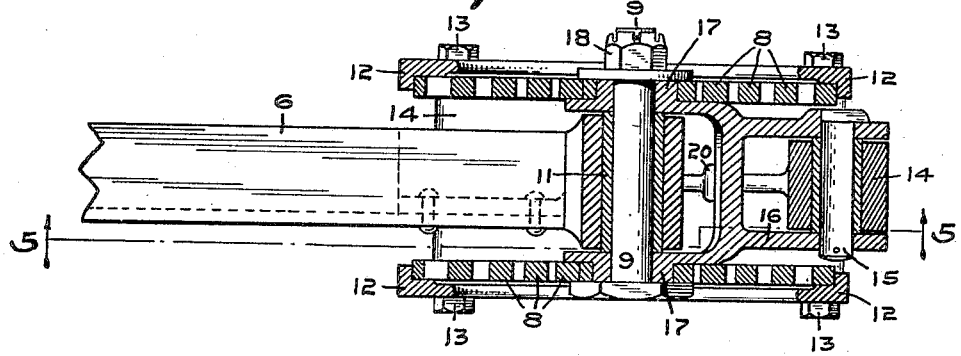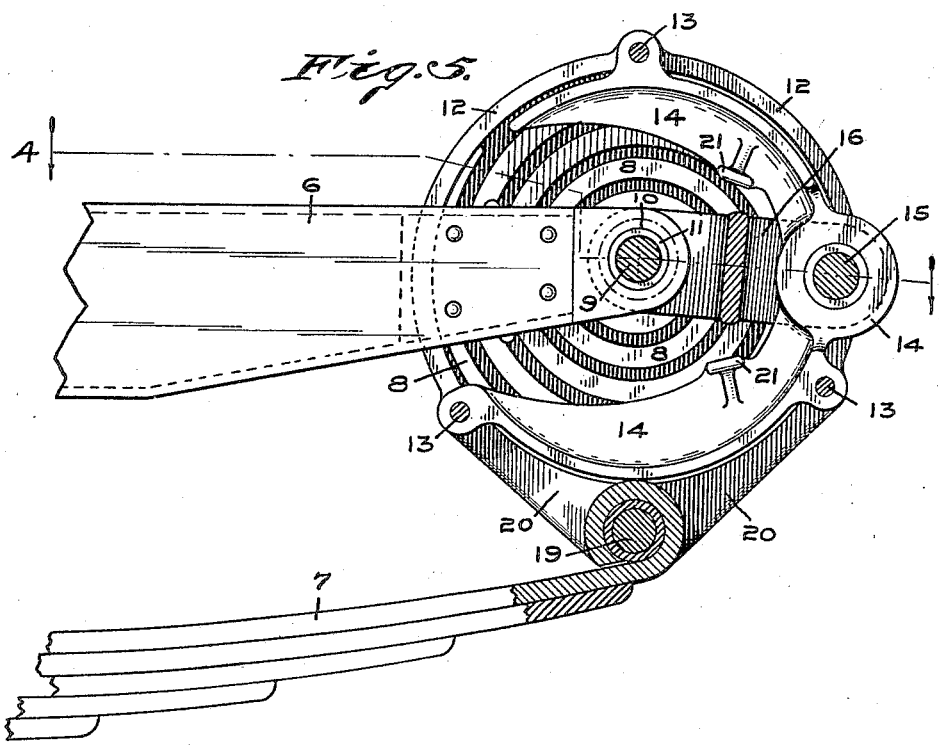

UNITED STATES PATENT OFFICE.

ROBERT H. HASSLER, OF INDIANAPOLIS, INDIANA.

SHOCK ABSORBER.

1,420,098.  Specification of Letters Patent. Patented June 20, 1922.

Application filed May 6, 1919. Serial No. 295,081.

*To all whom it may concern:*

Be it known that I, ROBERT H. HASSLER, a citizen of the United States, residing at Indianapolis, in the county of Marion and State of Indiana, have invented certain new and useful Improvements in Shock Absorbers, of which the following is a specification.

This invention relates to a shock absorber which is particularly applicable for use in motor vehicle construction; and one of the objects of the present invention is to add the resiliency of a spiral spring as an auxiliary to a vehicle leaf spring by certain mechanism which is simple and compact, thereby reducing the number of wearing parts to a minimum without disturbing their freedom of action.

A further object of the invention is to limit the action of a spiral spring associated with a vehicle leaf spring to a motion in a vertical plane without side sway.

I accomplish the above and other objects which will hereinafter appear, by the mechanism illustrated in the accompanying drawings, in which—

Figure 1 is a view in side elevation of an end of the main frame of a vehicle with my invention applied thereto. Fig. 2 is an end view of my device. Fig. 3 is a vertical section on the line 3—3 of Fig. 2. Fig. 4 is a view partly in top plan and partly in horizontal section, on the line 4—4 in Fig. 5. Fig. 5 is a view partly in side elevation and partly in vertical section, on the line 5—5 in Fig. 4.

Referring to the drawings. 5 is the front axle, 6 the main frame and 7 a vehicle leaf spring of usual construction which is pivotally connected intermediate its length to the axle in the usual manner. One end of leaf spring 7 is pivoted directly to frame 6 and the other end of the leaf spring 7 is connected with the frame 6 through the instrumentality of my invention, the embodiment of which, as here shown, comprises a pair of spiral springs 8, through the inner convolution of which passes a bolt 9, which also passes through the eye 10 at the end of the main frame 6, but is separated from direct contact with the latter by a spacer-sleeve 11, slightly longer than the width of the eye 10.

The spiral springs 8 are assembled in their respective housings 12. These housings are connected by bolts 13, here shown as three in number and a spacer 14, located between the said housings.

A pin 15 is journaled in the spacer 14, and to its projecting ends an H-shaped link 16 is rigidly secured and therewith held in a manner to freely oscillate with the pin 15 as a fulcrum. Bosses 17 on the opposite stems of the link enter the inner convolutions of the springs 8, thereby relieving the bolt 9 from directly bearing on said inner convolutions. One end of the bolt 9 is headed and bears against the adjacent surface of the inner convolution of one spring 8, and the other end of the bolt is threaded to receive a nut 18, which bears against the adjacent surface of the inner convolution of the other spring, and, by the intervention of the spacing-sleeve 11, the inner convolutions of both springs 8 are tightly clamped against link 16 by the tightening of nut 18.

The end of the main leaf spring 7 is journaled by means of a pin 19, to ears 20 projecting from the housing 12. Stops 21 are formed on spacer 14 against which the link 16 strikes at the limits of its action on its pivot pin 15. These stops 21 prevent the convolutions of the spiral springs 8 from striking against one another at the extreme ends of their working range, and thus protect them from breakage.

The elongation of the leaf spring 7 as it deflects is taken care of through the pivot action of the device as a whole on the bolt 9 and its journal in the eye 10 of the frame 6.

A slight torsion takes place in spiral springs 8 as leaf spring 7 elongates, due to the inner convolutions of spiral springs 8 being clamped endwise along pin 9 and spacer-sleeve 11.

The chief action of the spiral springs 8 is the vertical play they afford between the ends of the leaf spring 7 and the frame 6. This play is restricted to a vertical plane by the H-shaped link 16, which yokes over the eye 10 of the frame 6 at the inner end and over the pin 15 at the outer end, leaving link 16 free to oscillate vertically in its journal on the pin 15 in the spacer 14, and in the journal on the spacer-sleeve 11 in the eye 10 of the frame 6, so that spiral springs 8 and end of frame 6 are unrestricted as to motion in a vertical plane by link 16, but are restrained from moving in any other plane.

To obtain the maximum resiliency and action in the spiral springs 8, they are wound eccentrically and are mounted in housings 12, whereby the load acts in a direction opposite to the eccentricity, and the springs have most of the clearance between the convolutions of the spiral on the unloaded side available for spring action.

The device may be applied to either end of any type of conventional vehicle spring at front or rear of the vehicle.

In the application to the ordinary spring suspension, the device takes the place of regular shackle links, thus eliminating parts to offset those added.

Having thus fully described my said invention, what I claim as new and desire to secure by Letters Patent, is—

1. In a shock absorber, a frame, a spiral spring pivoted at its axis to said frame, an oscillating housing for confining said spiral spring, and means for pivotally connecting the axis of the spiral spring with the housing at a point eccentrically of the axis of the latter.

2. In a shock absorber, a frame, a leaf spring, a spiral spring pivoted at its axis to said frame, a housing for confining said spiral spring, means for pivotally connecting the axis of the spiral spring with the housing at a point eccentrically of the axis of the latter, and means for connecting said leaf spring eccentrically with said housing.

3. In a shock absorber, a frame, a leaf spring, an oscillating housing for confining said spiral spring, means for eccentrically connecting said leaf spring with said oscillating housing, a radial member connecting the housing eccentrically with the frame, and a spiral spring connecting the housing with the frame.

4. In a shock absorber, a frame, a leaf spring, a spiral spring, an oscillating housing, means for connecting said leaf spring eccentrically with said oscillating housing, a radial member pivotally connecting the axis of said spiral spring with said frame, and stops on said housing for limiting the range of oscillation of said radial member.

5. In a shock absorber for vehicles, a vehicle spring, a housing of irregular cylindrical form, a vehicle frame extending into said housing, a radial member connecting the end of the frame eccentrically with the housing, a spiral spring connecting the end of the frame with the housing, and means for connecting the leaf spring eccentrically with said housing.

6. In a shock absorber for vehicles, a vehicle frame, a housing, means for connecting the frame and housing to permit of free vertical oscillation of said housing about the end of the frame, a spiral spring yieldingly supporting the housing on the end of the frame, and a leaf spring pivoted eccentrically with said housing.

7. In a shock absorber for vehicles, a vehicle frame, a supplementary spring pivotally connected to the end of the frame, a support for said supplementary spring, means for connecting the axis of the supplementary spring eccentrically with said support, and a leaf spring connected eccentrically to said support.

8. In a shock absorber for vehicles, a vehicle frame, a leaf spring, a supplementary spring arranged on each side and supported at their axes in the end of said frame, a housing for confining and supporting the outer periphery of each of said supplementary springs, means comprising a spacer arranged between the supplementary springs for maintaining the latter a determined distance apart, means for eccentrically connecting the axes of both supplementary springs and the end of the frame with said spacer-means, and means for connecting eccentrically said vehicle leaf spring with said housings.

9. In a shock absorber for vehicles, a vehicle frame, a vehicle leaf spring, a pair of parallel supplementary spiral springs, a housing for confining each of said supplementary spiral springs having a connection eccentric of its axis with said vehicle leaf spring, means for pivotally connecting the axes of said supplementary spiral springs with the end of the frame, and means for eccentrically connecting both the axes of the supplementary spiral springs and the end of the frame with said housings.

10. In a shock absorber for vehicles, a vehicle frame, a vehicle leaf spring, a supplementary spiral spring arranged on each side and supported at their axes in the end of said vehicle frame, a housing yieldingly supported by each of said supplementary spiral springs, a spacer bearing against the adjacent sides of the supplementary spiral springs for holding the latter a determined distance apart, means for clamping the inner convolutions of the supplementary spiral springs, means for pivotally connecting the axes of the supplementary spiral springs and the end of the frame eccentrically with said spacer, and means for eccentrically connecting the vehicle leaf spring with said housings.

In witness whereof, I have hereunto set my hand and seal at Indianapolis, Indiana, this fifth day of May, A. D. one thousand nine hundred and nineteen.

ROBERT H. HASSLER. [L. S.]